Patented June 9, 1936

2,043,713

UNITED STATES PATENT OFFICE 2,043,713

WINE AND VINEGAR CLARIFICATION PROCESS

Lawrence G. Saywell, Berkeley, Calif.

No Drawing. Application December 24, 1934, Serial No. 759,047

11 Claims. (Cl. 99—48)

This invention relates to the clarification of wines and vinegars and has for its object an improved process easily carried out, low in cost of treatment, and yielding more permanent results to methods of wine and vinegar clarification as heretofore practiced. It is of course well known and has occasioned the wine and vinegar trade considerable concern that wines and vinegars, the latter whether prepared from grape musts, wine, or cider, even if carefully made, settled and filtered, will frequently in course of time sometimes running from a few weeks to a year or more, develop a cloudy or hazy appearance with consequent greatly reduced market value to a public which is more and more demanding brilliant clarity in bottled liquids of this kind as a supposed proof of quality. The cloudiness in these liquids is generally due to invisible suspended material which develops within the liquid due to its chemical and/or biological changes, and in some cases the cloudiness advances to a point where considerable suspended matter may be discerned with the unaided eye. The clouding of these liquids has been observed to take place in both pasteurized and unpasteurized vinegars and wines in sealed bottles as well as in those exposed to the air through absorbent cotton plugs.

Among the various processes heretofore used in clarifying these liquids may be mentioned direct filtration, with or without the use of filter aids such as diatomaceous earth, Super-Cel, etc., the use of absorbing agents such as activated carbon, precipitation with gelatine and tannin, casein, albumen, isinglass, etc., but these various methods have generally been found unsatisfactory either from the standpoint of the cost involved or trouble of treatment, or lack of permanency in the results attained.

Without going into details of the various prior treatments and theories as to the various causes of cloudiness in wines and vinegars, and the numerous experiments which I have made before evolving the simple method of treatment herein set forth, it will suffice to say that various iron compounds in the liquids are frequently largely responsible for the condition mentioned, or at least such wines as exhibit excessive cloudiness generally show a high iron content, though a number of other more or less unknown causes contribute to it, as some wines of low iron content, both new and old, are also subject to this objection. In the ordinary filtration of wines with the aid of diatomaceous earth or similar substance as a filter aid, the iron content of the resulting clear liquid has sometimes been found to have been appreciably increased due to the excessive iron content of the filter aid material used, and hence such wines and vinegars frequently developed more cloudiness with lapse of time than exhibited by the unfiltered liquid. Another factor having a strong bearing on the persistency of the cloudiness or its amenability to precipitation by flocculating agents is the pH value of the liquid and the nature of the electric charge of the particles of its colloidal suspension, which is generally positive.

After extensive experiments with most all proposed clarifying agents in tests extending over several years, I have discovered that a treatment of the wines or vinegar with a good grade of the swelling clay known as bentonite, sometimes with a prior treatment with powdered casein, will flocculate the suspended matter and settle to the bottom in from a few minutes to a few hours. In cases where the volume of matter precipitated was considerable and the precipitate too firm and heavy for easy filtration, it was found an advantage to use a filter aid powder with the bentonite addition. Heating of the wine or vinegar before introducing the bentonite was found to be an important factor in stabilizing the final product, as samples treated with bentonite without heating the liquid, though clear and brilliant, sometimes developed cloudiness again after standing from a month to several months or more, whereas the clarified product resulting from the treatment of hot wine or vinegar has been found to remain perfectly clear and bright for about three years, or since early samples have been preserved. The precise action of the bentonite is not thoroughly understood but is thought in a great measure due to its particles in colloidal suspension being negatively charged.

The casein treatment is valuable in wines and vinegars having an excessive iron content, though the bentonite alone will materially reduce it.

The bentonite should be of a good grade having high jelling properties and of relatively low iron content, and should be in form of a fine powder (about 85% or more passing a 200 mesh sieve). There are various deposits of this material in a few of the western States of the United States, particularly in Wyoming, the grade known in the trade as Clay Spur bentonite from that state being particularly suitable, though I have used bentonites from other deposits in Wyoming as well as some from other regions, including California.

In treating the wine or vinegar with the bentonite, the latter may be made up as a 5% suspension in water (or in some previously clarified wine when treating wine) and slowly added to the wine or vinegar with constant agitation, or the powder may be directly sifted into the wine or vinegar while subjecting the same to vigorous mixing for a few minutes, then permitted to settle for a few hours to a few days, dependent on the condition of the liquid, and the supernatant liquid withdrawn and the remainder filtered or centrifuged.

The amount of bentonite to be used will depend on the amount of turbidity or colloidal suspension to be removed, but I have tried various additions to give 1 part by wt. of bentonite to 100 parts of wine or vinegar all the way down to 1 part of bentonite to 10,000 parts of wine with satisfactory results, though an unnecessary amount of the powder needlessly increases the amount of precipitate to be handled. For vinegars about 1:1500 appeared to give optimum results in most cases, and for wines generally, about 1:1000 yielded good results, while for fairly clear wines 1:2000 was found sufficient.

As previously stated, for wines and vinegars containing much suspended matter a filter aid such as "Super-Cel" or "Hi-Flo" may be added, and in some cases, particularly where there is an excessive amount of iron compounds to be removed the treatment may be preceded with a casein treatment, especially in heavily clouded vinegars, where about one part of dry casein to 2,000 parts of vinegar, with or without 0.1% of filter aid added, with vigorous stirring, was thereafter settled and decanted and treated with the bentonite in the manner described, with a resulting brilliant clear liquid.

In cases of treatment of the wines or vinegars with bentonite it was found that slight reclouding sometimes occurred after long lapse of time, and that when the process was carried out with the wine or vinegar heated to about 150° F., or within a range of from about 100° to 175° F. that the resulting liquid after filtration or decanting appeared to be stabilized, as samples almost three years old show no change in their brilliant clarity.

In the commercial practice of the process it is therefore evident that it should be carried out in a closed system until cooled either spontaneously or by water circulation so as to avoid loss of valuable aromatic constituents.

I have further found that with the additional use of a small proportion of aluminum oxide, say up to about 15% of the weight of the bentonite generally required, the amount of bentonite for a given grade of wine or vinegar may be considerably reduced and the flocculation also somewhat improved. In fact, with 5% of the aluminum oxide the amount of bentonite may be reduced about 20%. The use of the aluminum oxide with the bentonite retards the initial flocculation but results in a somewhat more complete precipitation in a lesser total time than without it.

Having thus described my improved process of clarification of wines and vinegars and some of its variations, it will be evident to those skilled in the art that other modifications may be made and/or some of its features may be combined with the prior methods of clarification of these liquids, and I therefore claim:

1. The process of clarifying wine and vinegar which comprises agitating the same with bentonite to precipitate the objectionable suspended matter.

2. The process of clarifying wine and vinegar which comprises agitating the same with bentonite to precipitate the objectionable suspended matter, the bentonite being used in proportions of from one part to 100 all the way to 10,000 parts of the liquid.

3. The process of clarifying wine and vinegar which comprises agitating the same after heating, with bentonite to precipitate the objectionable suspended matter.

4. The process of clarifying wine and vinegar which comprises agitating the same after heating, with bentonite to precipitate the objectionable suspended matter, all carried out in a substantially closed system.

5. The process of clarifying wine and vinegar which comprises agitating the same with bentonite to precipitate the objectionable suspended matter, the liquid being heated to a temperature ranging from 120° F. to 175° F.

6. The process of clarifying wine and vinegar which comprises agitating the same with bentonite to precipitate the objectionable suspended matter, the liquid being heated to a temperature ranging from 120° F. to 175° F. before incorporating the bentonite.

7. The process of claim 1, preceded by precipitating suspended matter in the liquid with casein.

8. The process of claim 3, in which the bentonite is in the form of a fine powder and is sifted into the liquid while the latter is being vigorously stirred.

9. The process of claim 3, in which the bentonite is in the form of a fine powder and is sifted into the liquid while the latter is being vigorously stirred and, after settling, the liquid is separated from the precipitate.

10. The process of clarifying wine and vinegar which comprises agitating the same with bentonite and aluminum oxide to precipitate the objectionable suspended matter.

11. The process of clarifying wine and vinegar which comprises agitating the same with bentonite and aluminum oxide to precipitate the objectionable suspended matter, the bentonite being used in proportions of from one part to 100 all the way to 10,000 parts of the liquid, the aluminum oxide being in lesser proportion than the bentonite.

LAWRENCE G. SAYWELL.